United States Patent
Shenoy et al.

(10) Patent No.: US 7,932,635 B2
(45) Date of Patent: Apr. 26, 2011

(54) TRANSFER SWITCH SYSTEM WITH NEUTRAL CURRENT MANAGEMENT

(75) Inventors: Suratkal P. Shenoy, Mission Viejo, CA (US); Peter A. Panfil, Columbus, OH (US); Jeffrey M. Powell, Lewis Center, OH (US); Richard T. Caudill, Westerville, OH (US); William A. Barcus, Worthington, OH (US); James K. Martin, Galena, OH (US)

(73) Assignee: Liebert Corporation, Columbus, OH (US)

( * ) Notice: Subject to any disclaimer, the term of this patent is extended or adjusted under 35 U.S.C. 154(b) by 471 days.

(21) Appl. No.: 12/024,906

(22) Filed: Feb. 1, 2008

(65) Prior Publication Data
US 2008/0265679 A1    Oct. 30, 2008

Related U.S. Application Data

(60) Provisional application No. 60/914,630, filed on Apr. 27, 2007.

(51) Int. Cl.
*H02J 9/00* (2006.01)
*H02J 3/00* (2006.01)
(52) U.S. Cl. ............................. 307/64; 307/80
(58) Field of Classification Search ................ 307/80, 307/64
See application file for complete search history.

(56) References Cited

U.S. PATENT DOCUMENTS

| | | | |
|---|---|---|---|
| 2,245,342 A * | 6/1941 | Hoye | 307/64 |
| 4,110,808 A | 8/1978 | Hobson, Jr. | |
| 4,157,461 A | 6/1979 | Wiktor | |
| 5,138,184 A | 8/1992 | Keefe | |
| 6,172,432 B1 | 1/2001 | Schnackenberg et al. | |
| 6,538,345 B1 | 3/2003 | Maller | |
| 7,030,514 B2 | 4/2006 | Wareham et al. | |
| 7,129,599 B2 | 10/2006 | Divan et al. | |
| 7,157,811 B2 * | 1/2007 | Eaton et al. | 307/80 |
| 7,340,355 B2 * | 3/2008 | Kang et al. | 702/58 |
| 2003/0048005 A1 | 3/2003 | Goldin et al. | |
| 2004/0070278 A1 | 4/2004 | Divan et al. | |

FOREIGN PATENT DOCUMENTS

| | | |
|---|---|---|
| JP | 11187576 A | 7/1999 |
| WO | WO 03049130 | 6/2003 |

OTHER PUBLICATIONS

International Search Report for Corresponding International Patent Application No. PCT/US2008/056108, Aug. 5, 2008.
Written Opinion for Corresponding International Patent Application No. PCT/US2008/056108, Aug. 5, 2008.

(Continued)

*Primary Examiner* — Hal I Kaplan
(74) *Attorney, Agent, or Firm* — Locke Lord Bissell & Liddell LLP

(57) ABSTRACT

An electrical power transfer system for selectively connecting a load to a first power source or a second power source includes a first switch having an input selectively connected to the first power source and an output connected to the load. A second switch includes an input and an output connected to the load. An isolation device has its input connected to the second power source and its output connected to the input of the second switch to provide a continuous neutral path for the second power source and to isolate a neutral current path of the load from the second power source.

16 Claims, 1 Drawing Sheet

OTHER PUBLICATIONS

Nash Jr, Hugh. "More About Standby Generator Grounding, GFP, and Currents That Go Bump in the Night." Industry Applications Conference, 1995, Thirtieth IAS Annual Meeting, Oct. 8-12, 1995, vol. 3, pp. 2241-2248, Orlando.

(Abstract) Nash Jr, Hugh. "More About Standby Generator Grounding, GFP, and Currents That Go Bump in the Night." Industry Applications, IEEE Transactions on May/Jun. 1997.

(Abstract) Dunn, S.D. and Wells, F. "Stray Neutral and Current Problems and Analysis Associated With Multiple ATS Generator Installations." Industrial and Commercial Power Systems Technical Conference, 1998.

Wikipedia, "Transfer Switch." [retrieved from the Internet on Apr. 23, 2008 using <URL: http://en.wikipedia.org/wiki/Transfer_switch>].

* cited by examiner

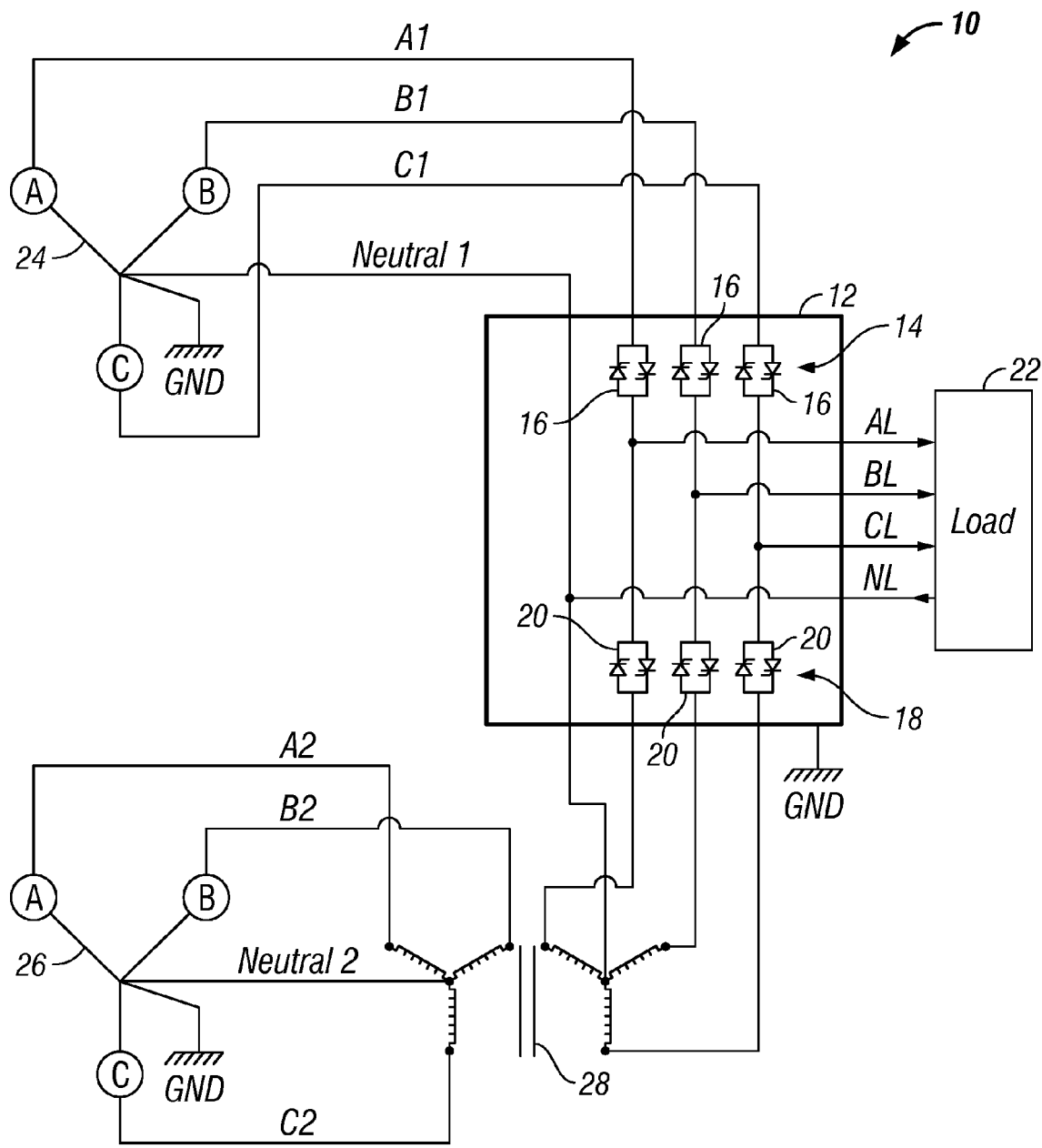

TRANSFER SWITCH SYSTEM WITH NEUTRAL CURRENT MANAGEMENT

CROSS REFERENCE TO RELATED APPLICATIONS

This application claims benefit of and priority to U.S. provisional patent application Ser. No. 60/914,630, filed on Apr. 27, 2007, the entire contents of which are incorporated herein by reference for all purposes.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The inventions disclosed and taught herein relate generally to dual-bus static switches; and more specifically to a three-pole transfer switch system for managing neutral current.

2. Description of the Related Art

In an automatic electrical power transfer switch system, the system selectively connects, either manually or automatically, one of two independent power sources to a load. Under normal conditions, when the first power source is available, the system connects the first power source to the load. If the first power source fails, the transfer switch system will connect the second power source to the load to prevent disruption of power to the load.

Typically, each power source includes a neutral line solidly grounded to meet safety code requirements. The neutral lines are connected to a common point that provides a single neutral connection to the load. Since the neutral current must complete its path to the power source that is feeding the load, the neutral line current may split into two portions, one to each power source. This condition creates undesirable ground currents that can create ground loops in the distribution system, which can cause unwanted ground fault interrupter trips.

Applicant has invented a neutral current management system for a dual-bus static transfer switch for four-wire loads.

BRIEF SUMMARY OF THE INVENTION

In accordance with the present invention, a transfer switch system for selectively connecting a load to a first power source or a second power source is provided. The system includes a first switch having an input selectively connected to the first power source and an output connected to the load. A second switch includes an input and an output connected to the load. The neutral current line of the second power source is isolated from the load when the first power source is connected to the load.

BRIEF DESCRIPTION OF THE SEVERAL VIEWS OF THE DRAWINGS

For a more complete understanding of the present invention and for further advantages thereof, reference is now made to the drawing which is a schematic block diagram of one embodiment of the inventions disclosed and taught herein.

DETAILED DESCRIPTION

In general, the present invention comprises a electrical power transfer system configured to transfer a load between a first and second electrical power source without providing multiple neutral current paths between the power sources. For example, an automatic or manual transfer switch system according to the present invention may comprise an output connected to a load, a first switch for selectively connecting and/or disconnecting the load to the first power source, a second switch for selectively connecting and/or disconnecting the load to the second power source, wherein the neutral line of the second power source is isolated from the neutral line of the first power source and/or the neutral line of the load. One preferred embodiment comprises a transformer that has its input connected to the second power source and its output connected to the input of the second switch so that the neutral current line of the second power source is isolated from the load and/or the first power source.

Turning now to a more detailed description of a particular embodiment, the FIGURE illustrates a dual-bus, three-pole, transfer switch system for a four wire load, which is generally identified by the numeral 10. System 10 includes a dual-bus transfer switch 12. Transfer switch 12 comprises a three-pole static transfer switch comprising a first switch 14 comprising three pairs of SCRs 16. Transfer switch 12 further includes a second switch 18 comprising three pairs of SCRs 20. It will be appreciated that while switches 14 and 18 are described as SCR-type switches, other types of switches conventionally used in transfer switch systems can be used as well. Transfer switch 12 is connected to a four-wire load 22.

System 10 is shown selectively connected to a primary power source 24 and a second or alternative power source 26. As illustrated in the FIGURE, power sources 24 and 26 are three phase, independent power sources having outputs A1, B1, C1 and N1, and A2, B2, C2 and N2, respectively. It will be appreciated that outputs N1 and N2 are neutral current lines associated with power sources 24 and 26.

Transfer switch 12 selectively connects either power source 24 or power source 26 to load 22, through load lines AL, BL, CL and NL. In primary operation when power source 24 is on-line or otherwise available, transfer switch 12 connects power source 24 to load 22. In secondary operation when power source 24 is not available, transfer switch connects second power source 26 to load 22. Neutral current management is provided by an isolation device, such as transformer 28, which is connected between the output of second power source 26 and the input to switch 18. The input side of isolation device 28 provides a continuous neutral path for the second power source 26 and the output side of isolation device 28 provides a continuous neutral path for load 22 that is isolated from the neutral path for the second power source 24 thereby eliminating undesirable ground current loops. It will be appreciated that transformer 28 is powered or functions only when power source 26 provides power to load 22.

In primary operation, the first power source 24 provides power to load 22 through switch 14 and load lines AL, BL, and CL. Neutral line current is returned to the first power source 24 along NL and N1, and not through line N2, which is isolated from load 22 and first power source 24.

In primary operation, the first power source 114 provides power to load 112 through switch 104 and load lines AL, BL, and CL. Neutral line current is returned the first power source 114 along NL and N1, and not through line N2, which is isolated from load 112 and first power source 114.

If power source 24 fails, goes off-line or is otherwise unavailable, transfer switch 12 will connect, either automatically and/or manually, as designed or desired, power source 26 to load 22 through switch 18 and load lines AL, BL, CL to prevent disruption of power to load 22. Neutral line current is returned to ground along line NL and N1, and not through line N2, which is isolated from load 22 and first power source 24 by isolation device 28.

Isolation device 28 is illustrated in the FIGURE as a Y-Y transformer which isolates neutral current line, N2, when power source 24 provides power to load 22. Transformer 28 effectively operates as a zero-phase shift isolation transformer and may include, for example, a dual zigzag configuration or a tertiary delta Y-Y configuration.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. An electric power transfer system comprising:
   a first switch having an input connectable to a first power source and an output connectable to a load, where the load has a neutral current line connected to a neutral current line of the first power source;
   a second switch having an input and having an output connectable to the load; and
   a transformer having an input connectable to a second power source and an output connected to the input of the second switch, where the second power source comprises a neutral current line; and
   whereby the transformer provides a continuous neutral current path for the second power source and isolates the neutral current line of the load from the second power source, such that the neutral current line of the load remains connected to the neutral current line of the first power source when the second power source provides power to the load.

2. The system of claim 1 wherein said first and second switches comprise a three-pole switch.

3. The system of claim 2 wherein the first and second switches comprise a three-pole SCR switch.

4. The system of claim 2 wherein the load is a three-phase load.

5. The system of claim 1 wherein the transformer is a Y-Y transformer.

6. The system of claim 1 wherein the transfer of the load from first power source to the second power source occurs automatically upon failure of the first power source.

7. The system of claim 1 wherein the transfer of the load from first power source to the second power source occurs manually after failure of the first power source.

8. A transfer switch system for selectively connecting a load to a first power source or a second power source, each power source having a neutral current line, the system comprising:
   a first switch having an input connected to the first power source and an output connected to the load;
   a second switch having an input and having an output connectable to the load; and
   a transformer having an input connected to the second power source and an output connected to the input of the second switch to isolate the neutral current line of the second power source from the load, wherein the load remains coupled to the neutral current line of the first power source when the second power source provides power to the load.

9. An electric power transfer system comprising:
   a first three-pole SCR switch having an input connectable to a first power source having and an output connectable to a three-pole load, where the first power source and load each have a neutral current line;
   a second three-pole switch having an input and having an output connectable to the load; and
   a Y-Y transformer having an input connectable to a second power source having a neutral current line, and a transformer output connected to the input of the second switch; and
   whereby the transformer provides a continuous neutral path for the second power source and isolates the neutral path of the load from the second power source; such that the neutral path of the load is not sourced from the second power source when the second power source supplies power to the load.

10. The system of claim 9 wherein the transfer of the load from first power source to the second power source occurs automatically upon failure of the first power source.

11. The system of claim 9 wherein the transfer of the load from first power source to the second power source occurs manually after failure of the first power source.

12. A method of transferring a load between power sources, comprising:
   providing first and second power sources, each power source comprising a neutral current line;
   providing a load with a neutral current line;
   interposing a first switch between the load and the first power source for selectively supplying power to the load such that a neutral current path is established and maintained between the first power source and the load when either the first or second power sources supply power to the load;
   interposing a second switch between the load and the second power source such that the neutral current line of the second power source is isolated from the neutral current line of the load; and
   wherein the neutral current path is maintained between the first power source and the load when the second power source supplies power to the load.

13. The method of claim 12 further comprising interposing an isolation device between the second switch and the second power source to provide a continuous neutral path for the second power source and to isolate a neutral current path of the load from the second power source.

14. The method of claim 13, further comprising automatically transferring the load from the first power source to the second power source upon failure of the first power source.

15. The method of claim 14, wherein the isolation device is a Y-Y transformer, the load is a three-phase load and the first and second power sources are each three-phase sources.

16. The system of claim 9, wherein the neutral path of the load is sourced from the first power source when the second power source supplies power to the load.

* * * * *

UNITED STATES PATENT AND TRADEMARK OFFICE
CERTIFICATE OF CORRECTION

| | | |
|---|---|---|
| PATENT NO. | : 7,932,635 B2 | Page 1 of 1 |
| APPLICATION NO. | : 12/024906 | |
| DATED | : April 26, 2011 | |
| INVENTOR(S) | : Suratkal P. Shenoy et al. | |

It is certified that error appears in the above-identified patent and that said Letters Patent is hereby corrected as shown below:

At Claim 9, Column 4, Line 8 please delete the word as seen below:

"having"

Signed and Sealed this
Thirty-first Day of May, 2011

David J. Kappos
*Director of the United States Patent and Trademark Office*